(12) United States Patent
Heuer et al.

(10) Patent No.: US 6,175,441 B1
(45) Date of Patent: Jan. 16, 2001

(54) ELECTROCHROMIC DEVICE BASED ON POLY-(3,4-DIOXY-THIOPENE) DERIVATIVES

(75) Inventors: Helmut Werner Heuer; Rolf Wehrmann, both of Krefeld; Friedrich Jonas, Aachen; Frank Osenberg, Leverkusen, all of (DE)

(73) Assignee: Heuer, Leverkusen (DE)

( * ) Notice: Under 35 U.S.C. 154(b), the term of this patent shall be extended for 0 days.

(21) Appl. No.: 09/266,372

(22) Filed: Mar. 11, 1999

(30) Foreign Application Priority Data

Mar. 13, 1998 (DE) ............................... 198 10 932

(51) Int. Cl.⁷ ............... G02F 1/153; G02F 1/15; C08K 3/18; B32B 15/04
(52) U.S. Cl. .......... 359/273; 359/265; 359/270; 524/430; 428/457
(58) Field of Search ................ 345/105, 179; 359/265, 266, 267, 270, 273, 275, 274; 524/408, 430; 428/457, 690, 704

(56) References Cited

U.S. PATENT DOCUMENTS

| | | | |
|---|---|---|---|
| 3,280,702 | 10/1966 | Hereth et al. | 89/1.805 |
| 4,851,308 | 7/1989 | Akhtar | 429/192 |
| 4,902,108 | 2/1990 | Byker | 350/357 |
| 5,140,455 | 8/1992 | Varaprasad et al. | 359/275 |
| 5,187,608 | 2/1993 | Blohm et al. | 359/273 |
| 5,300,575 | 4/1994 | Jonas et al. | 525/186 |
| 5,657,149 | 8/1997 | Buffat et al. | 359/275 |
| 5,766,515 | 6/1998 | Jonas et al. | 252/500 |

FOREIGN PATENT DOCUMENTS

| | | | |
|---|---|---|---|
| 0272428 | 6/1988 | (EP) | G02F/1/17 |
| 0435689 | 3/1991 | (EP) | C09K/9/02 |
| 0440947 | 3/1993 | (EP) | C09K/9/02 |
| 0686662 | 12/1995 | (EP) | C08K/5/092 |
| 96/03475 | 2/1996 | (WO) | C09K/9/02 |

OTHER PUBLICATIONS

J. C. Gustafsson et al, Solid State Ionics, vol. 69, No. 145–152 (1994).
J. C. Gustafsson et al, Electrochimica Acta, vol. 40 No. 13–14, pp. 2233–2235 (1995).
B. P. Jelle, G. Hagen, J. Electrochem, Soc., vol. 140, No. 12 3560 (1993) pp. 3560–3564.
Hollemann–Wiberg, Lehrbuch der organischen Chemie, 71$^{st}$ to 80$^{th}$ Edition, Walter de Gruyter & Co., Berline 1971, pp. 779–781, Rompp Chemie Lexikon; Chemical Abstract 1313–96–8.
Houben Weyl, Methoden der organischen Chemie, vol. E 20, Makromolekulare Stoffe, Part 2, (1987) (p. 1141 ff).
Electronique International No. 276, 16 (1997); Saint–Gobain.

*Primary Examiner*—Georgia Epps
*Assistant Examiner*—David N. Spector
(74) *Attorney, Agent, or Firm*—Connolly, Dove, Lodge & Hutz LLP

(57) ABSTRACT

Electrochromic assemblies having a layer structure, characterized in that one layer is an electrically conductive, electrochromic polydioxythiophene and a further layer comprises as ion storage compounds selected from the group consisting of the formulae (I) to (VI)

$$Me^1O_2 \qquad (I),$$
$$Me^2{}_2O_5 \qquad (II),$$
$$Li_xMe^1O_2 \qquad (III),$$
$$Li_xMe^2{}_2O_5 \qquad (IV),$$
$$Li_xMe^1O_{2+x/2} \qquad (V),$$
$$Li_xMe^2{}_2O_{5+x/2} \qquad (VI),$$

where
$Me^1$ and $Me^2$ are each a metal of transition group III, IV and V of the Mendeleev Periodic Table, and
$x$ is from 0.001 to 5.

13 Claims, 6 Drawing Sheets

Fig. 1
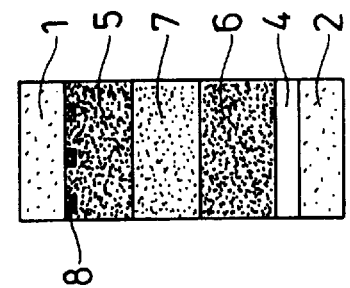
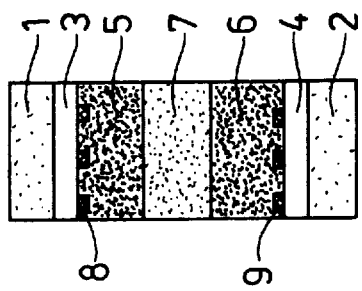 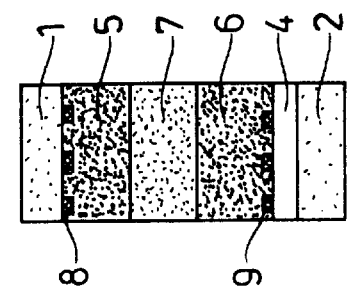
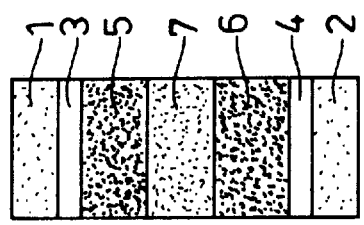 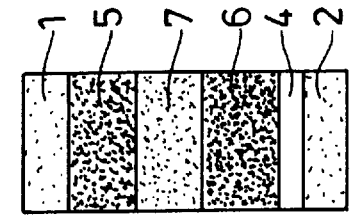
I)                II)

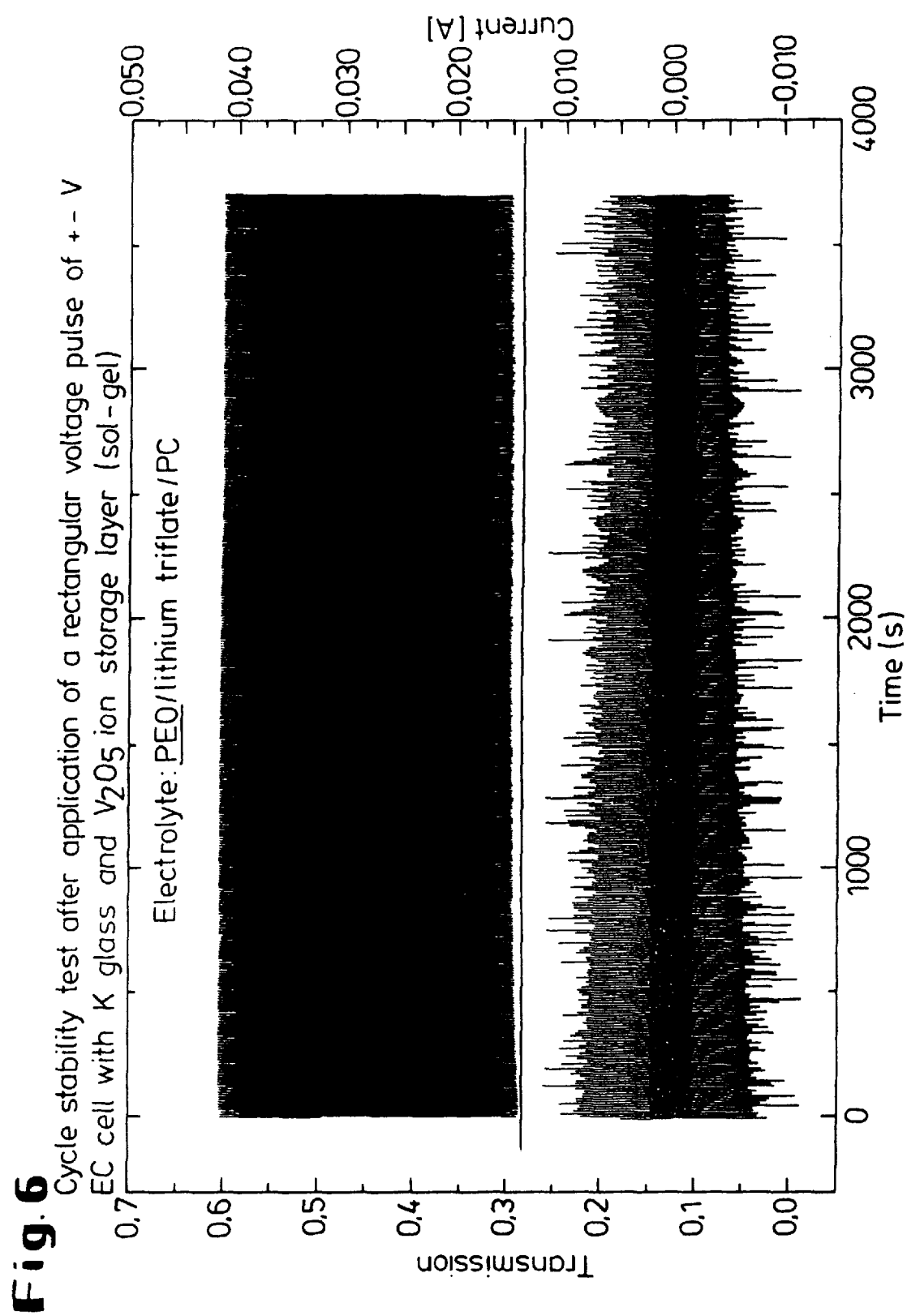
Fig. 6 Cycle stability test after application of a rectangular voltage pulse of +- V EC cell with K glass and V₂O₅ ion storage layer (sol-gel)
Electrolyte: PEO/lithium triflate/PC

ELECTROCHROMIC DEVICE BASED ON POLY-(3,4-DIOXY-THIOPENE) DERIVATIVES

The present invention relates to electrochromic devices having controllable light transmittance, their production and their use.

BACKGROUND OF THE INVENTION

Windows of vehicles have hitherto not been able to be regulated in terms of their transparency to electromagnetic radiation. Phototropic glasses have hitherto only been used for spectacles and have only a relatively small change in the transmission. Windows in buildings have hitherto been darkened using curtains, shutters, roller blinds or other movable mechanical elements. Electrochromic devices can thus be applied in many ways. In summary, examples are:

1. Vehicle Glazing (window panes or sunroofs in cars)

An electrochromic device is suitable for protection against sun or dazzling in motor vehicles. Front, side and rear windows or glass roofs cam be included. The degree of darkening can be matched zonewise and steplessly to the needs of the driver, to the state of the sun and to the current driving situation. Integration into a computerized control system is possible. A combination of the active element with a composite glazing unit is likewise possible, for example application of a film system to panes of safety glass.

SUMMARY OF THE INVENTION

The transmittance of the panes can be controlled manually or automatically, which can be used for effective protection against dazzling during night driving, automatic adjustment of the brightness level when driving in and out of tunnels and multistorey carparks and for protection against breaking-in and theft of the parked vehicle by preventing vision into the vehicle interior. Excessive heating of the interior in summer, particularly in the case of a parked vehicle, can be prevented (cf. EP-A 0 272 428).

2. Glazing of Buildings (electrochromic window)

In buildings, electrochromic assemblies are suitable for darkening side windows and skylights of buildings, dwelling rooms, workrooms or greenhouses as controllable protection against sun (visible spectral region) and heat (IR region) and for protecting the eyes (visible spectral region). For protection against break-ins, glazing of bank counters or display windows can be darkened at the press of a button. Glass doors can be made transparent automatically on approach of a person in order to avoid injury. The opportunity of producing virtually all shades of colour also makes it possible to blend the glazing into the facade of a building. The energy consumption for controlling the transparency of large areas of window is low, particularly when the memory effect of the system can be exploited and energy is only consumed in the switching phase. A combination with heat-protection glazing (K glass) is very suitable for achieving dynamic control of solar radiation through a window ("smart window"). An electrochromic system can thus contribute to regulating and limiting the energy necessary for air conditioning of a building.

The voltage supply to the system can also be provided by solar modules. A light-sensitive sensor can determine the degree of solar radiation and thus control the light transmittance.

3. Display Elements

The ability to produce attractive colours and the large-area portrayal of any contours, e.g. letters, figures, signs and symbols (able to be produced by means of suitable structuring techniques) provides advertising with an interesting medium. Decorative and informative effects are readily possible.

Apart from the possibility of arranging the system between panes of glass, there is also the alternative of using two or even only one transparent plastic film as support. This makes possible poster-like advertising media with changeable information.

Electrochromic devices can be used for small display elements such as faces of clocks or dials of measuring instruments, displays for a wide variety of applications and for large display elements such as traffic signs, advertising columns, information displays at railway stations, airports or for parking direction systems. Use as a variable delineation system (playing area boundaries, etc.) in sports halls is likewise possible.

The use of such systems is generally possible wherever information is to be made visible.

4. Optics

In optics, electrochromic systems can be used either in combination with glasses, lenses and filters of other optical instruments or as sole actively used component. Their use as lap dissolve protection for optical detection systems is likewise possible. The system is likewise suitable as controllable filter system in photographic processes.

5. Mirrors

An electrochromic device can also be used as a dimmable mirror, e.g. in an automobile as external or rear-vision mirror which can be darkened by application of an electric potential and thus prevents dazzling by the headlights of other vehicles (cf., for example, U.S. Pat. No. 3 280 702, U.S. Pat. No. 4 902 108 (Gentex), EP-A 0 435 689, U.S. Pat. No. 5 140 455). A disadvantage of systems according to the prior art (solution systems) is the colour inhomogeneity after prolonged operation (segregation), particularly in the case of large mirrors (e.g. mirrors for heavy goods vehicles). Increasing the viscosity of the solution system by addition of polymeric thickeners has been described (e.g. U.S. Pat. No. 4 902 108).

6. EMI shielding

An electrochromic device can also be used as a variable filter element for the modulation of electromagnetic radiation in certain wavelength regions.

Electrochromic devices normally comprise a pair of glass or plastic plates of which, in the case of a mirror, one is mirrored. One side of -these plates is coated with a light-transparent, electrically conductive layer, e.g. indium-tin oxide (ITO). A cell is built up from these plates by fixing them with their electroconductively coated sides facing one another; the cell between the plates contains the electrochromic system. It is tightly sealed. The two plates can be separately provided with electric contacts and controlled via the conductive layers.

The electrochromic solution systems known from the above-cited prior art contain, in a solvent, pairs of redox substances which form coloured, positively or negatively charged, chemically reactive free radicals after reduction or oxidation. Examples are the viologen systems which have been known for a longr time.

The pair of redox substances used here is in each case a reducible and an oxidizable substance. Both are colourless or have only a slight colour. Under the action of an electric potential, one substance is reduced and the other is oxidized, at least one becoming coloured. After switching off the potential, the two original redox substances are reformed, with decoloration or lightening of colour occurring.

It is known from U.S. Pat. No. 4,902,108 that suitable pairs of redox substances are those whose reducible substance has at least two chemically reversible reduction waves in the cyclic voltammogram and the oxidizable substance correspondingly has at least two chemically reversible oxidation waves. Systems of this type are suitable mainly for dimmable rear view mirrors in cars. Since these are solution systems, use in electrochromic windows is not a possibility under normal circumstances.

Also known are systems in which the actual electrochromic redox pair is dispersed in a polymer matrix (see, for example, WO-A 96/03475). The undesirable effect of segregation is suppressed here.

Combinations of inorganic electrochromic components such as $WO_3$, $NiO$ or $IrO_2$ are likewise known and are possibilities as components in an electrochromic window (see, for example, U.S. Pat. No. 5 657 149, Electronique International No. 276, 16 (1997); Saint-Gobain).

These inorganic electrochromic components can be applied to the conductive substrate only by vapour deposition, sputtering or the sol-gel technique. As a result, systems of this type are very expensive to produce. In the context of efforts to replace an inorganic component by an organic polymer component, electrochromic systems, for example, based on the electrically conductive polymer polyaniline (PANI) and $WO_3$ as complementary electrochromic materials have become known (see, for example, B. P. Jelle, G. Hagen, J. Electrochem. Soc., Vol. 140, No. 12, 3560 (1993)). An attempt has also been made to use systems without an inorganic component, where the ITO or $SnO_2$ layer (counterelectrode) is supposed to serve as complementary electrochromic component to substituted poly(3,4-alkylenedioxy-thiophenes) (U.S. Pat. No. 5 187 608).

However, it is found that such electrochromic assemblies are unsuitable for ensuring a sufficient number of switching cycles without a change in the device properties.

The present invention provides an electrochromic device having a layer structure, characterized in that one layer is an electrically conductive, electrochromic polydioxythiophene and a further layer comprises as ion storage compounds selected from the group consisting of the formulae (I) to (VI)

$Me^1O_2$ (I), $Me^2{}_2O_5$ (II), $Li_xMe^1O_2$ (III), $Li_xMe^2{}_2O_5$ (IV), $Li_xMe^1O_{2+x/2}$ (V), $Li_xMe^2{}_2O_{5+x/2}$ (VI), where
  $Me^1$ and $Me^2$ are each a metal of transition group III, IV and V of the Mendeleev Periodic Table,
  x is from 0.001 to 5.
  $Me^1$ is preferably zirconium, cerium or titanium.
  $Me^2$ is preferably vanadium or niobium.
  Very particular preference is given to using the following ion storage layers:
    $V_2O_5$,
    $Li_xV_2O_5$,
    $Li_xV_2O_{5+x/2}$,
    $CeO_2$,
    $Li_xCeO_2$,
    $Li_xCeO_{2+x/2}$,
    $Nb_2O_5$,
    $Li_xNb_2O_5$,
    $Li_xNb_2O_{5+x/2}$.

The ion reservoir can also be a mixture of at least two of the compounds (I) to (VI).

Particular preference is given to using the following mixtures:
  $TiO_2$—$CeO_2$,
  $CeO_2$—$V_2O_5$,
  $TiO_2$—$V_2O_5$,
  $Li_xCeO_2$—$Li_xV_2O_5$,
  $Li_xTiO_2$—$Li_xV_2O_5$,
  $Li_xTiO_2$—$Li_xCeO_2$
  $V_2O_5$—$Nb_2O_5$,
  $Li_xV_2O_5$—$Li_xNb_2O_5$.

The ion reservoir in the structure according to the invention thus comprises a metal oxide compound or a mixture of metal oxides. The ion storage layers can include an Li salt when they are produced or else can be loaded electrochemically with Li ions only afterwards.

The compounds of the formulae (I) to (VI) are generally known compounds, commercially available or can be prepared by generally known methods of inorganic chemistry (cf., for example, Hollemann-Wiberg, Lehrbuch der organischen Chemie, 71st to 80th Edition, Walter de Gruyter & Co., Berlin 1971, pages 779–781, Römpp Chemie Lexikon; Chemical Abstract 1313–96–8.

The electrochromic device of the invention thus contains at least one inorganic ion storage layer. This can be applied either by a sol-gel process or by vapour deposition/sputtering to an electrically conductive substrate which can be provided with a metal grid to improve the conductivity. It can also comprise nanosize particles which can be applied by means of a casting technique.

The polydioxythiophenes are preferably cationically charged and built up of structural units of the formula (VII)

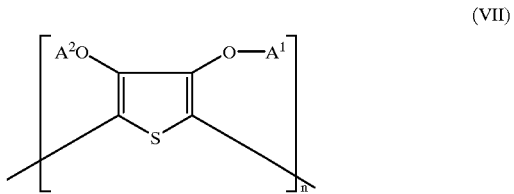

(VII)

where $A^1$ and $A^2$ are, independently of one another, substituted or unsubstituted $(C_1$–$C_4)$-alkyl or together form substituted or unsubstituted $(C_1$–$C_4)$-alkylene, and n is an integer from 2 to 10,000, preferably from 5 to 5000, and preferably contain polyanions.

Preferred cationic polydioxythiophenes are built up of structural units of the formula

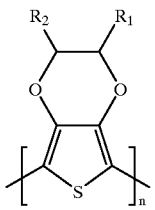
(VIIa)

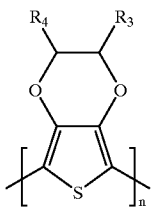
(VII b)

where

R₁ and R₂ are, independently of one another, hydrogen, substituted or unsubstituted (C₁–C₈)-alkyl, preferably (C₁–C₁₀)-, in particular (C₁–C₆)-alkyl, (C₂–C₁₂)-alkenyl preferably (C₂–C₈)-alkenyl, (C₃–C₇)-cycloalkyl, preferably cyclopentyl, cyclohexyl, (C₇–C₁₅)-aralkyl, preferably phenyl-(C₁–C₄)-alkyl, (C₆–C₁₀)-aryl, preferably phenyl, naphthyl, (C₁–C₁₈)-alkyloxy, preferably (C₁–C₁₀)-alkyloxy, for example methoxy, ethoxy, n- or iso-propoxy, or (C₂–C₁₈)-alkyloxy ester and R₃ and R₄ are, independently of one another, hydrogen, but not both at the same time, or (C₁–C₁₈)-alkyl, preferably (C₁–C₁₀)-, in particular (C₁–C₆)-alkyl, (C₂–C₁₂)-alkenyl, preferably (C₂–C₈)-alkenyl, (C₃–C₇)-cycloalkyl, preferably cyclopentyl, cyclohexyl, (C₇–C₁₅)-aralkyl, preferably phenyl-(C₁–C₄)-alkyl, (C₆–C₁₀)-aryl, preferably phenyl, naphthyl, (C₁–C₁₈)-alkyloxy, preferably (C₁–C₁₀)-alkyloxy, for example methoxy, ethoxy, n- or iso-propoxy or (C₂–C₁₈)-alkyloxy ester, each substituted by at least one sulphonate group, n is from 2 to 10,000, preferably from 5 to 5000.

Very particularly preferably, the electrochromic device of the invention contains at least one electrically conductive, electrochromic cationic or uncharged polydioxythiophene of the formula (VII a-1) and/or (VII b-1)

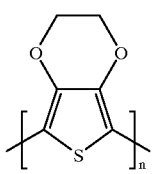
(VII a-1)

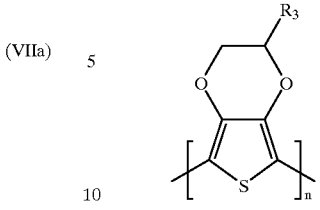
(VII b-1)

where

R₃ is as defined above, n is an integer from 2 to 10,000, preferably from 5 to 5000.

As polyanions, use is made of the anions of polymeric carboxylic acids such as polyacrylic acids, polymethacrylic acids or polymaleic acids and polymeric sulphonic acids such as polystyrenesulphonic acids and polyvinylsulphonic acids. These polycarboxylic and polysulphonic acids can also be copolymers of vinylcarboxylic and vinylsulphonic acids with other polymerizable monomers such as acrylic esters and styrenes.

Particular preference is given to the anion of polystyrene sulphonic acid as counterion.

The molecular weight of the poly acids which give the polyanions is preferably from 1000 to 2,000,000, particularly preferably from 2000 to 500,000. The poly acids or their alkali metal salts are commercially available, e.g. polystyrenesulphonic acids and polyacrylic acids, or can be prepared by known methods (see, for example, Houben Weyl, Methoden der organischen Chemie, Volume E 20 Makromolekulare Stoffe, Part 2, (1987), p. 1141 ff).

In place of the free poly acids required for forming the dispersions of polydioxythiophenes and polyanions, it is also possible to use mixtures of alkali metal salts of the poly acids and corresponding amounts of mono acids.

In the case of the formula (VIIb1), the polydioxythiophenes bear positive and negative charges in the structural unit. The preparation of the polydioxythiophenes is described, for example, in EP-A 0 440 957 (=U.S. Pat. No. 5,300,575).

The polydioxythiophenes are obtained by oxidative polymerization. This gives them positive charges which are not shown in the formulae since their number and position cannot be determined definitively.

The present invention accordingly provides an electrochromic device comprising electrically conductive poly(3,4-ethylenedioxythiophene) derivatives as cathodically colouring electrochromic polymers and suitable ion storage layers for Li ions. A gel electrolyte comprising a crosslinked or uncrosslinked polymer, an Li salt and a particular amount of a solvent is located between the electrochromic polymer layer and the ion storage layer. The schematic structure is shown in FIG. 1, principle I).

BRIEF DESCRIPTION OF THE DRAWINGS

FIG. 1 is a schematic view of electrochromic devices according to the present invention;

FIG. 6 shows the results of a cycle stability test.

Figure 2:
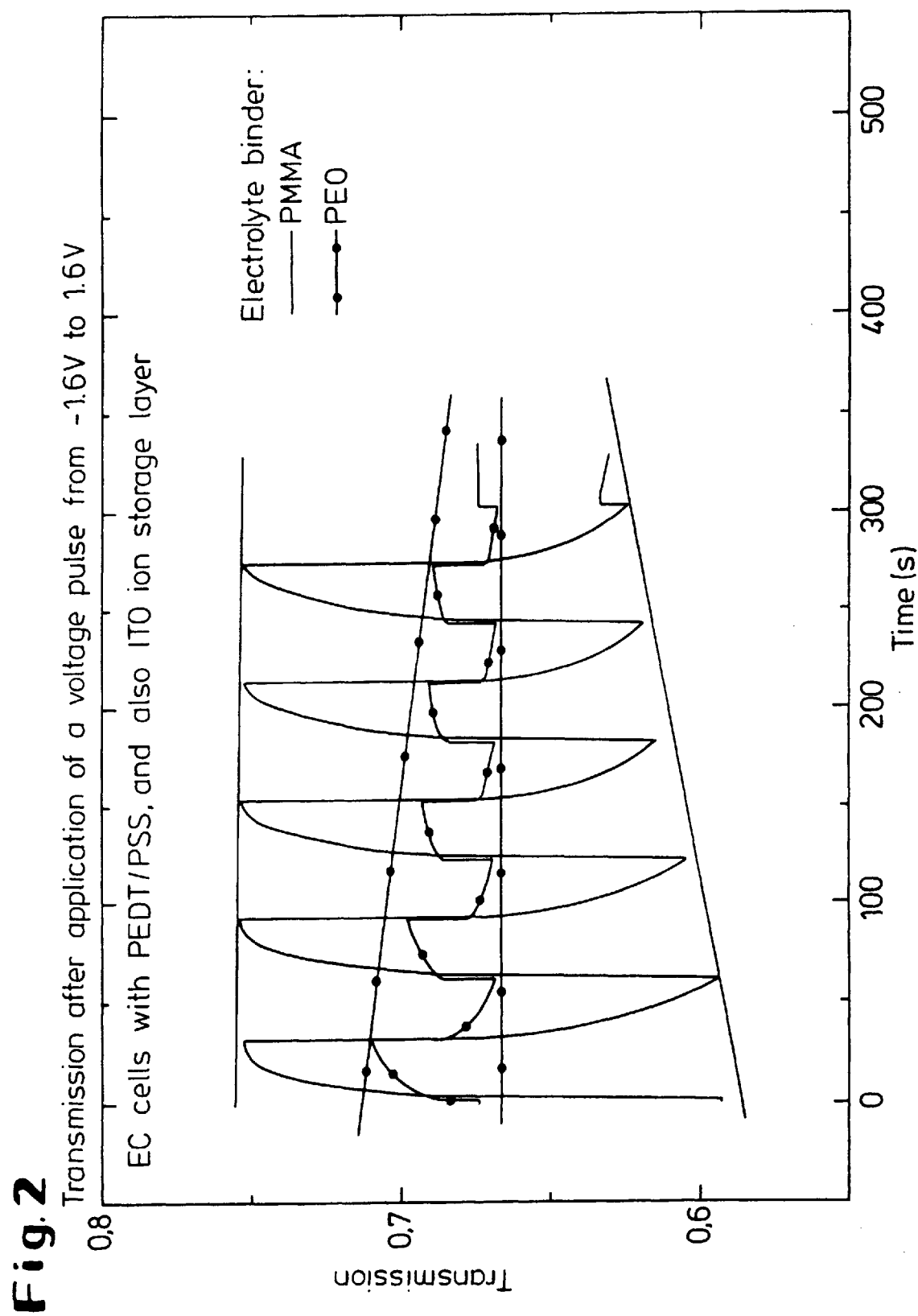
FIG. 2 shows the results of a cycle stability test.

Legend for FIG. 1:
1,2: Substrate
3,4: Electrically conductive coating, one of which can act as a mirror
5: Electrochromic polymer, e.g. PDT/PSS (poly(3,4-ethylenedioxythiophene) polystyrenesulphonate
6.: Ion storage layer
7: Gel electrolyte (crosslinked or uncrosslinked)
8,9: Fine metal grid (optional)

DETAILED DESCRIPTION OF THE INVENTION

The electrochromic polymer layer is transparent in the doped state. This can be converted into a coloured form by uptake of electrons (reduction) at the cathode with acquisition of an absorbance in the visible region of the spectrum. The oxidation which proceeds on the opposite side (anode) is linked to an exchange reaction of the ion storage layer with Li ions. However, this reaction barely contributes to generation of colour so that it does not interfere.

The present invention accordingly provides an electrochromic solid-phase system incorporating at least one redox-active electrically conductive polymer selected from the group consisting of poly(3,4-alkylenedioxythiophene) derivatives which can be admixed with polystyrenesulphonate to make them processable from solution or bear a solubilizing sulphonate group in a side chain. This polymer layer is preferably applied from aqueous solution, with evaporation of the solvent leaving the solid, dry polymer film on the substrate. However, it should also be able to be applied by screen printing. The substrate used is preferably an electrically conductive, transparent glass or film system, with a layer of indium-tin oxide (ITO), fluorine-doped tin oxide (FTO, K-glass), undoped tin oxide or a layer of finely divided silver serving as electrode. It is also possible for one side of the electrode to consist of a metal layer (e.g. Al, Cu, Pd) which is no longer transparent (when used in a mirror). The gel electrolyte comprises at least one polymer (e.g. polyethylene oxide, PMMA), at least one Li salt (e.g. lithium triflate, lithium perchlorate) and at least one solvent (e.g. propylene carbonate).

The present invention provides not only for use as electrochromic device in glazing of building or architectural glazing and as vehicle glazing or sunroof but also to use as display element, as electrochromic mirror (e.g. self-dimming automobile rear view mirror) and use in various optical elements.

For use as a mirror, one of the two electrodes can consist of a vapour-deposited or electrochemically deposited metal coating, e.g. aluminium, silver, copper, platinum, palladium, rhodium.

The present invention further provides an electrochromic system in which the colour-producing electrochromic polymer compound functions simultaneously as its own electrode, as a result of which only one conductive coating of ITO, fluorine-doped tin oxide or a metal is necessary (see, FIG. 1, principle II))

Legend for FIG. 1, principle II):
1,2: Substrate
4: Electrically conductive coating which can also act as a mirror
5: Electrochromic polymer
6: Ion storage layer
7: Gel electrolyte (crosslinked or uncrosslinked)
8,9 Fine metal grid (optional)

A particularly advantageous aspect of the electrochromic assembly of the invention is that it can be combined with a heat protection glass (commercially available for architectural glazing purposes) explicitly as a positive structural feature for energy-saving measures in rooms into which the sun shines strongly. Further explicit electrodes of other material are therefore not necessary since the heat-protection layer limits the transmission of IR radiation and at the same time, due to its electrical conductivity, takes over the electrode function in the electrochromic assembly.

The electrochromic assembly of the invention is also notable for the fact that the electrochromic layer can also absorb IR radiation in particular regions and thus can limit the transmission of heat through the pane.

The electrochromic layer assembly of the invention is suitable as a constituent of an electrochromic device. In an electrochromic device, the electrochromic layer assembly of the invention serves as a medium having variable transmission, i.e. the light transmittance of the system changes under the action of an electric potential by going from a colourless state to a coloured state. The present invention therefore also provides electrochromic devices in which an electrochromic assembly according to the invention is present. Applications of this electrochromic device are in architectural glazing and in vehicles, e.g. as window pane, car sunroof, automobile rear view mirror, display or as optical element or as constituent of information display units such as instrument displays in vehicles of any type.

If the electrochromic device is an electrochromic display device, one or both of the two conductive layers is/are divided into electrically separate segments which are individually provided with contacts.

It is, however, also possible for only one of the two plates to have a conductive coating and be divided into segments. The segments can be separated, for example, by mechanical removal of the conductive layer, e.g. by scoring, scratching, scraping or milling or by chemical means, for example by etching using, for example, a hydrochloric acid solution of $FeCl_2$ and $SnCl_2$. This removal of the conductive layer can be controlled in terms of location by means of masks, e.g. masks of photoresist. However, the electrically separate segments can also be produced by targeted, e.g. by means of masks, application, e.g. sputtering or printing, of the conductive layer. The provision of the segments with contacts is carried out, for example, by means of fine strips of conductive material, so that the segment is electrically connected to a contact at the edge of the electrochromic device. These fine contact strips can consist of the same material as the conductive layer itself and, for example, be produced together with it in the division of the layer into segments, as described above. However, they can also consist, e.g. for improving the conductivity, of other material such as fine metallic conductors, for example of copper or silver. A combination of metallic material and the material of the conductive coating is also possible. These metallic conductors can, for example, be applied in fine wire form, e.g. adhesively bonded-on, or be printed on. All these techniques just described are generally known from the production of liquid crystal displays (LCDs).

In the case of displays, the displays according to the invention can be viewed in transmitted light or reflectively via mirroring.

If the electrochromic device is an electrochromic window, a fine metal grid can be vapour deposited onto one or both electrodes. This serves to improve the surface conductivity of the substrates and is advantageous in the case of large areas in order to achieve a uniform colour.

The electrochromic assembly of the invention preferably incorporates at least one transparent, electrically conductive coating comprising indium-tin oxide ($In_2O_3:SnO_2$ (ITO)), tin oxide ($SnO_2$), fluorine-doped tin oxide ($SnO_2:F$; FTO or "K glass", "heat protection glass"), antimony-doped tin oxide, antimony-doped zinc-oxide, aluminium-doped zinc oxide or a transparent metal film having a sufficiently thin thickness, e.g. silver coating (heat protection glass) on a substrate (glass or plastic).

Other conductive polymers such as substituted or unsubstituted polythienyls, polypyrroles, polyanilines, polyacetylene or polythiophenes can also be used.

In the assembly of the invention, the actual electrochromic polymer can also be used advantageously as its own conductive electrode material in place of one of the above-mentioned conductive coatings.

Very particular preference is given to using indium-tin oxide ($In_2O_3:SnO_2$ (ITO)), zinc oxide ($SnO_2$), fluorine-doped tin oxide ($SnO_2:F$; FTO, "K glass", "heat protection glass") or a transparent silver coating having a sufficiently thin thickness (heat protection glass).

If one of the plates is mirrored, this conductive layer can also be utilized. Particular preference is here given to using silver, aluminium, copper, platinum, palladium and rhodium.

The electrochromic assembly of the invention preferably includes a transparent gel electrolyte comprising the following components:
polymer (crosslinked or uncrosslinked)
Li salt
Solvent or solvent mixture Preferred polymers here are polymethylmethacrylate (PMMA), polyethyleneoxide (PEO), polyacrylonitrile (PAN), poly(N,N,-dimethylacrylamide), poly (2-(2-methoxyethoxy)-ethoxy)phosphazene, poly(oxymethylene-oligo(oxyethylene)), polyethylene glycols (PEGs), polypropylene glycols (PPGs) or polymers based on polyepichlorohydrin or polyethers and also mixtures. Copolymers such as Ethylene oxide-propylene oxide (EO/PO) copolymer or oxymethylene-bridged polyethylene oxides can also be used.

Particular preference is given to using polyethers and polyethylene oxides.

Particular preference is also given to photocrosslinkable polymer systems based on acrylates, e.g. polyethylene glycol 400 diacrylate, polyethylene glycol 400 dimethacrylate, polyethylene glycol 600 diacrylate, polyethylene glycol 600 dimethacrylate, polyethylene glycol methacrylate, tripropylene glycol diacrylate, tripropylene glycol monomethyl ether acrylate, trimethylolpropane triacrylate, ethylene glycol dimethacrylate, hydroxyethyl methacrylate (HEMA), hexanediol diacrylate, dianol diacrylate, tetraethylene glycol diacrylate, pentaerythritol triacrylate, pentaerythritol tetraacrylate, butyl methacrylate. The photocrosslinkable polymer systems should be able to be cured in the presence of the solvent used and the Li salt with the aid of light activation by means of a customary photoinitiator such as ®Darocure 1173, 1116 or ®Irgacure 184 (E. Merck KGaA, Darmstadt) even between thick glass plates which are provided with a transparent electrical coating. Illumination is carried out after filling the cell by irradiation with a suitable lamp, (e.g. UV lamps such as Hg or Xe lamps). Curing of polymer systems by electron beam curing is likewise possible for the systems mentioned.

Very particular preference is also given to polymer systems which can be crosslinked thermally and catalytically via isocyanate groups with OH-functional polyether compounds, e.g. polyether polyols, to form polyurethane. Polyurethanes having different soft segments such as polytetramethylene glycol or polypropylene glycol can also be used.

Very particular preference is also given to modified siloxanes derived from, for example, gamma-glycidylpropyltrimethoxysilane. These can be, for example, variants modified by means of polypropylene oxide.

The gel electrolytes can also contain organic and/or inorganic fillers or additives. Here, the customary additives such as thermostabilizers, optical brighteners, flame retardants, flow improvers, dyes, pigments, fillers or reinforcing materials, finely divided minerals, fibrous materials, chalk, quartz flour, glass, aluminium oxide, aluminium chloride and carbon fibres can be added in customary amounts. The function of a spacer can be assumed, for example, by glass spheres, polymer particles, silica gel or sand grains having a defined size, if this is necessary.

Preferred Li salts are $LilCO_4$, $LiCF_3SO_3$, $LiN(SO_2CF_3)_2$, LiCl, $LiPF_6$.

Very particular preference is here given to $LiClO_4$, $LiCF_3SO_3$ and $LiN(SO_2CF_3)_2$.

Particularly preferred solvents are propylene carbonate, ethylene carbonate, acetonitrile and y-butyrolactone and also mixtures thereof.

Very particular preference is given to using propylene carbonate and ethylene carbonate.

Substrates used in the electrochromic assembly of the invention are glass or various types of plastic.

Preference is given to generally transparent substrates of any type.

Particularly preferred materials are glass, specifically heat protection glass for the application as electrochromic window (in thicknesses of 10 µm in the case of "flexible glass, thin glass" up to 3 cm) and also polyesters (e.g. polyethylene terephthalate (PET) or polyethylene naphthalate (PEN)), various types of polycarbonate, (e.g. Makrolon®, APEC-HT)®, polysulphones, polyimides and polycycloolefins. The polymeric substrate can be used as a flexible film or as a thick plate. The substrate can also be curved, so that the assembly of layers matches the shape of the base. A flexible plastic substrate can, after construction of the total electrochromic system, also be laminated onto or adhesively bonded onto various bases such as curved glass.

The plastic substrates can be additionally provided with barrier layers against water and oxygen.

Preferred barrier layers are $TiO_x$, $SiO_x$ on polyester, e.g. polyethylene terephthalate, Du Pont, (cf. packaging films) or fluorinated polymers; (ACLAR) and possible combinations thereof and also barrier layers based on inorganic-organic hybrid systems.

The electrochromic assembly of the invention can, when configured as a flexible film system, be laminated or adhesively bonded as a complete electrochromic composite system onto the safety glass panes of cars. It can also be integrated into the hollow space of a composite glass pane system in architectural glazing.

The control mechanism of the electrochromic assembly is based on the reversible electrochemical doping of the electrochromic polymer which results in great colour changes, for example from colourless to blue. The assembly is controlled by means of defined voltages.

The reduction and oxidation processes in the electrochromic assembly of the invention generally occur by uptake and release of electrons at the cathode and anode respectively, with the potential difference between the electrodes preferably being from 0.1 to 5 V, very particularly preferably from 0.1 to 3 V. After switching off the electric potential, the previously achieved colour can be maintained for a prolonged period (memory effect) so that a permanent colour can be achieved with minimal energy consumption. Brief reversal of the polarity can spontaneously achieve charge neutralization and thus decoloration.

In the case of relatively large areas, the electrochromic assembly of the invention is also characterized in that it can be supplied by means of solar modules.

In addition, it has been found that the electrochromic polymer film does not have to be produced in situ on the electrically conductive substrate, but can be applied from an ecologically harmless aqueous solution by a casting technique, by spin coating/dip coating, by screen printing or by spraying. This method is particularly suitable for large-area systems.

It has also been found that very particularly preferred ion storage layers can be produced by a very gentle sol-gel process. Thus, a very effective ion reservoir based on vanadium pentoxide can be obtained from aqueous ammonium vanadate solution after treatment with a cation exchanger and subsequent ageing even at very low temperatures, so that plastic substrates can be coated under mild conditions using this method.

The aqueous ammonium vanadate solution can either be mixed with an Li salt (e.g. $LiCF_3SO_3$) or be applied to the substrate without this salt and then heat-treated.

To improve the wetting of the substrate, it is also possible to add a wetting agent (e.g. Fluortensid).

EXAMPLES

Example 1

Application of an Electrochromic Polymer to an ITO Substrate

The polymer Baytron® P (aqueous dispersion of the conductive polymer PEDT/PSS, polyethylenedioxythiophene-polystryrene sulphonate from Bayer AG)

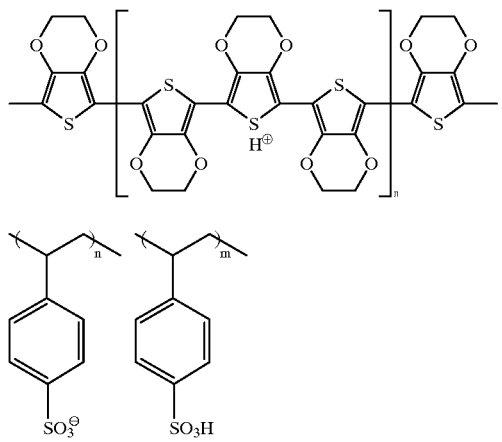

is applied from an aqueous solution which still contains isopropanol to the electrically conductive side of an ITO-glass plate (Merk-Balzers, Liechtenstein, surface resistance <15 Ω/sq) by means of a spin coater, with 4 applications of 15 seconds each being made at a rotational speed of 1500 rpm. During application, the solvent is evaporated by means of a hair dryer.

This gives a transparent, only very slightly bluish polymer film. Measurement of the thickness of the layer using a profilometer gave a value of 0.6 μm.

Example 2

Application of Baytron® P to K Glass

Baytron® P (as in Example 1) is applied from aqueous solution to the electrically conductive side of a K glass plate (heat protection pane from Flachglas, Germany, surface resistance ~20 Ω/sq) by means of a spin coater, with 4 applications of 15 seconds each being made at a rotational speed of 1500 rpm. During application, the solvent is evaporated by means of a hair dryer.

This gives a transparent, only very slightly bluish polymer film. Measurement of the thickness of the layer gave a value of 0.6 μm.

Example 3

Preparation of a Sol for Producing the Ion Storage Layer 2.5 g of ammonium vanadate $NH_4(VO_3)$ are dissolved in 25 g of water and 37.5 g of the ion exchanger Lewatit S100 (Bayer AG) are added. The mixture is subsequently stirred at room temperature for 10 minutes. While stirring rapidly, another 475 g of water are then added and the mixture is stirred for another 10 minutes. The mixture is filtered and the resulting solution is allowed to stand for 24 hours at room temperature for ageing to take place. Finally, 0.25 g of the wetting agent Fluortensid FT 248 (Bayer AG) is added thereto. This solution is ready to use.

Example 4

Preparation of an Ion Storage Layer 1 ($V_2O_5$)

The solution from Example 3 is applied to the conductive side of a K glass plate, ITO-PET film or ITO glass and a uniform layer of the sol was produced by means of the spin coater (10 sec. at 1000 rpm). The coating is subsequently heated at 50° C. for 24 hours. Measurement of the thickness of the layer using the profilometer gives 10–20 nm.

Example 5

Preparation of an Ion Reservoir Layer 2($Li_xV_2O_5$)

1 g of the solution from Example 3 is admixed with 0.01 g of $LiCF_3SO_3$ (lithium triflate from Aldrich, 89555 Steinheim, Germany) and the mixture is stirred well. This solution is applied to K glass or ITO-PET as described in Example 4 to produce, in an analogous manner, an ion reservoir layer which, unlike Example 4, already contains Li ions.

Example 6

Preparation of a Gel Electrolyte 1

The following mixture is produced:
7.0 g of acetonitrile
2.0 g of propylene carbonate (dry)
0.7 g of PMMA ($M_w$ about 15,000)
0.3 g of $CF_3SO_3Li$ (Aldrich)

After everything has dissolved, the solution is filtered once and is ready to use.

Example 7

Preparation of a Gel Electrolyte 2

The procedure of Example 6 is repeated using the following constituents:
7.0 g of acetonitrile
2.0 g of propylene carbonate
0.7 g of polyethylene oxide (PEO; $M_w$ about 200,000)
0.3 g of $CF_3SO_3Li$ (Aldrich)

Example 8

Preparation of a Gel Electrolyte 3

The procedure of Examples 6 and 7 is repeated using the following constituents:
9.0 g of acetonitrile
0.7 g of polyethylene oxide (PEO; $M_w$ about 200,000)
0.3 g of $CF_3SO_3Li$ (Aldrich)

Example 9
Preparation of a Gel Electrolyte 4

7.7 g of the unsaturated aliphatic urethane acrylate Roskydal® UA VP LS 2258 (Bayer AG) are mixed with 0.1925 g (2.5% by weight) of photoinitiator Darocure® 1173 from Merck, Darmstadt, and 0.3 g (3% by weight) of lithium trifluoromethane-sulphonate from Aldrich in 2 g of dry 1,2-propylene carbonate from Aldrich. This mixture is pourable and can be crosslinked photochemically, enabling a gel electrolyte which no longer flows to be prepared.

Example 10
Preparation of a Gel Electrolyte 5

7.7 g of the amine-modified polyether acrylate Roskydal® UA LP V94/800 (Bayer AG) are mixed with 0.1925 g (2.5% by weight) of photoinitiator Darocure® 1173 from Merck, Darmstadt, and 0.3 g (3% by weight) of lithium trifluoromethane-sulphonate from Aldrich in 2 g of dry 1,2-propylene carbonate from Aldrich. This mixture is pourable and can be crosslinked photochemically, enabling a gel electrolyte which no longer flows to be prepared.

Example 11
Preparation of a Gel Electrolyte Layer 1

The gel electrolyte 1 from Example 6 is applied to the ion storage layer from Example 5 by means of a spin coater (30 sec. at 1000 rpm). During the coating process, the volatile acetonitrile evaporates virtually completely, leaving the gel electrolyte as a layer.

Example 12
Preparation of a Gel Electrolyte Layer 2

The gel electrolyte 2 from Example 7 is applied to the ion storage layer from Example 4 by means of a spin coater (30 sec. at 1000 rpm). During the coating process, the volatile acetonitrile evaporates virtually completely, leaving the gel electrolyte as a layer.

Example 13
Preparation of a Gel Electrolyte Layers 3 and 4

The still uncrosslinked gel electrolytes 4 and 5 from Examples 9 and 10 are applied to the ion storage layer I from Example 4 in a wet film thickness of 200 $\mu$m and brought into contact with an electrochromic layer from Example 2. This composite is conveyed through under a UV lamp (IST lamp) at a conveyor belt speed of 20 m/min. This results in crosslinking of the gel electrolyte. Systems which are transparent and contain a gel electrolyte which no longer flows are obtained.

Example 14 (Comparison: Without ion storage layer)
Production of a Complete Electrochromic Cells 1 and 2

Gel electrolytes b1 and 2 from Examples 6 and 7 are applied uniformly to the conductive side of ITO glasses and brought into contact with the Baytron P-coated sides of glass substrates from Example 1. This gives in each case an electrochromic layer assembly which is characterized in Example 16.

Example 15 (According to the invention)
Production of a Complete Electrochromic Cells 3 and 4

Gel electrolytes 1 and 2 from Examples 6 and 7 are applied uniformly to the ion storage layer 1 from Example 4 on ITO glasses and brought into contact with the Baytron P-coated sides of glass substrates from Example 1. This gives in each case an electrochromic layer assembly which is characterized in Example 17.

Example 16
Cycle Stability Test on the Electrochromic Cells 1 and 2

A DC potential of 1.5 V is applied for a short time to the ITO layers of each of the electrochromic cells 1 and 2 from Example 14 before the polarity of the electric control is then changed. This gives a cyclic colouring and decoloration of the cell. At the same time, the change with time of the transmission through the cell is observed. It is found that assemblies without an ion storage layer have no cycle stability (see FIG. 2). This is to be improved by the present invention, as is demonstrated in Example 17.

Example 17
Cycle Stability Test on the Electrochromic Cells 3 and 4

Figure 3:
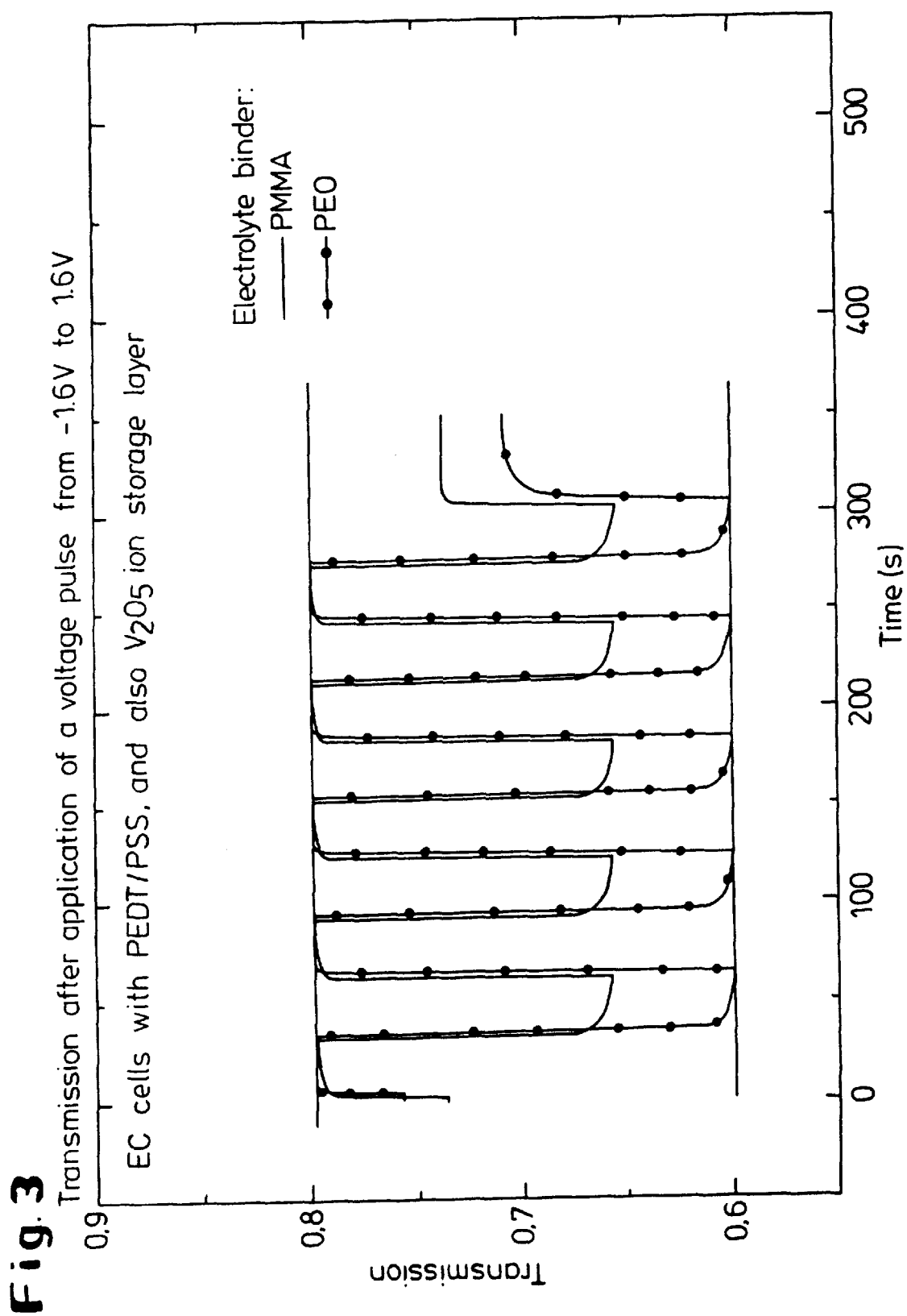
FIG. 3 also shows the results of a cycle stability test.

A DC potential of 1.5 V is applied for a short time to the conductive layers of the coated ITO glasses from Examples 1 and 4 of the electrochromic cells 3 and 4 from Example 15 before the polarity of the electric control is then changed. This gives a cyclic colouring and decoloration of the cell. At the same time, the change with time in the transmission through the cell is observed. It is found that assemblies having these ion storage layers have a significantly improved cycle stability compared with previous assemblies (see Example 16) (see FIGS. 2 and 3).

Example 18
Production of a Complete Electrochromic Cells 5 and 6

The gel electrolyte 2 from Example 7 is in each case applied uniformly to the ion reservoir layer 2 from Example 5 on K glasses and brought into contact with the Baytron P-coated sides of K glass substrates from Example 2. This gives in each case an electrochromic layer assembly which is characterized in Examples 19 to 21.

Example 19
Cyclovoltametric Study of the Electrochromic Cells 5 and 6

Figure 4:
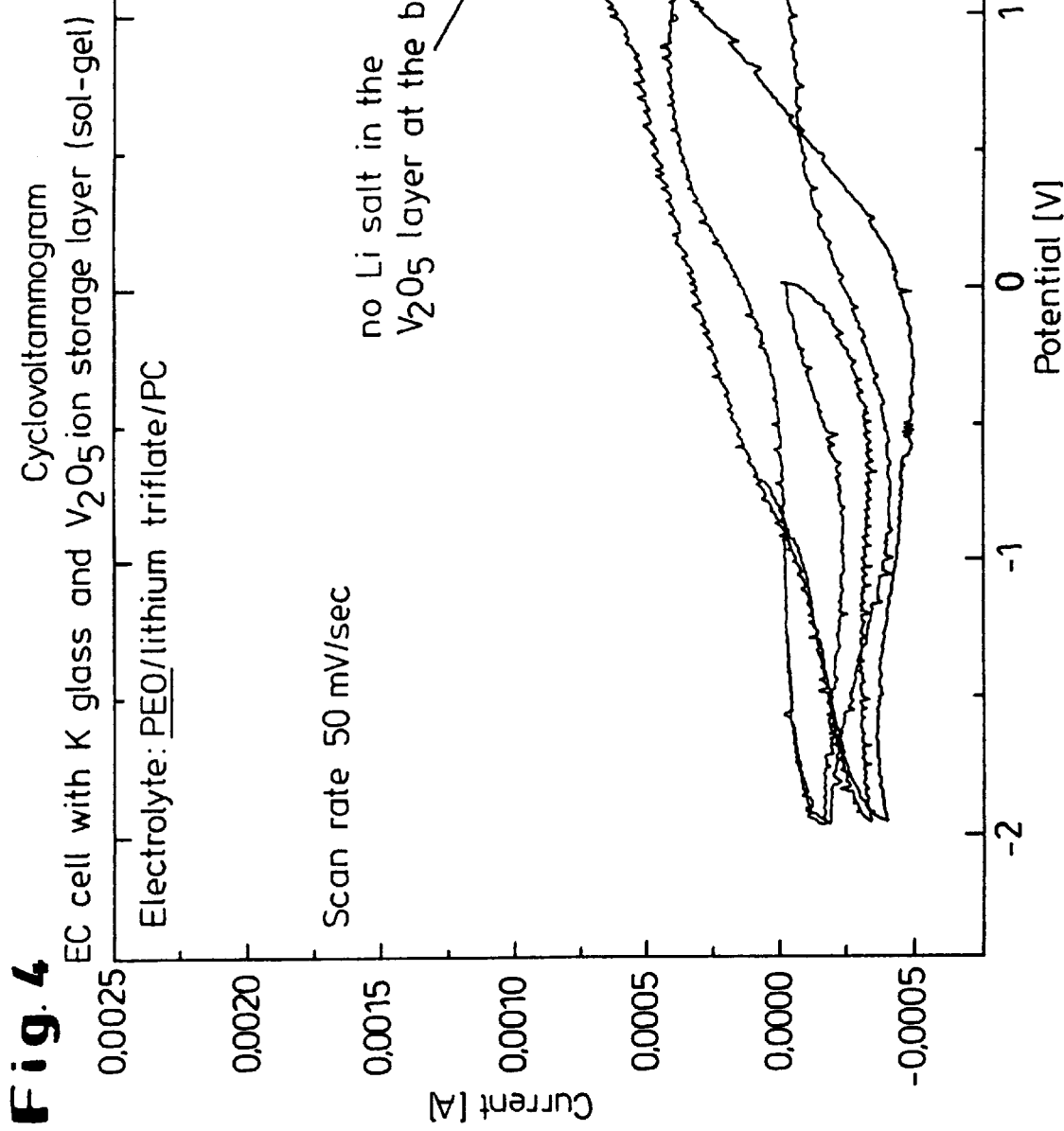
FIG. 4 shows the results of a cyclovoltametric study.

The current-voltage curves of the cells 5 and 6 from Example 18 are characterized by cyclic voltametry in a two-electrode assembly without reference between +2 V and −2 V (reversal of polarity). As can be seen in FIG. 4, the electrochemical property profile of the assembly can be varied by selection of the ion reservoir preparation.

Example 20
Optical Study on the Electrochromic Cells 5

Figure 5:
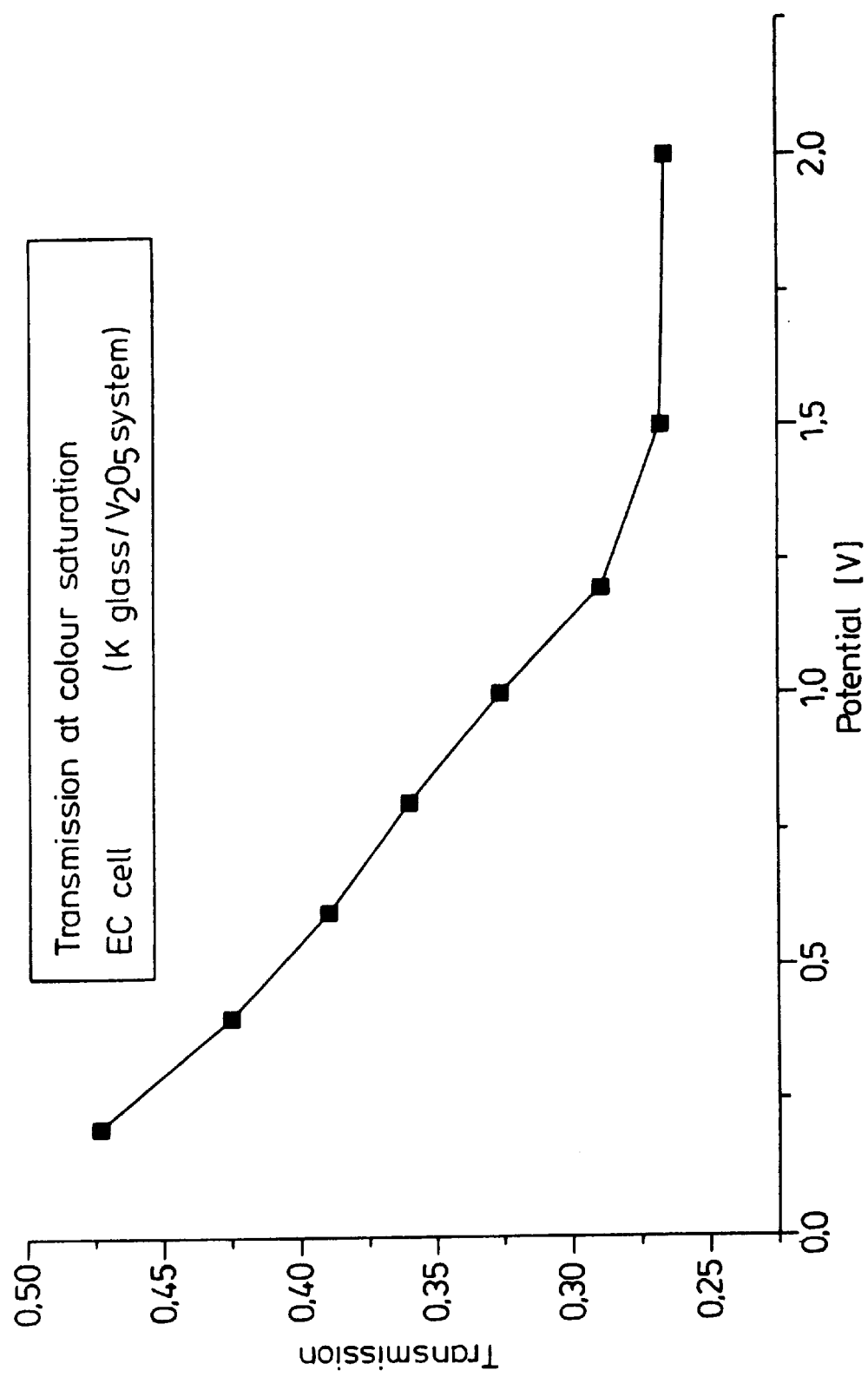
FIG. 5 shows the results of an optical study.

The transmission of the assembly is measured at various control voltages. As can be seen in FIG. 5, the maximum coloration of the electrochromic system can be achieved at a potential as low as 1.5 V.

Example 21
Cycle Stability Test on the Electrochromic Cell 5

A DC potential of 1.5 V is applied for a short time to the conductive layers of the coated K glasses from Examples 2 and 4 of the electrochrormic cell 5 from Example 18 before the polarity of the electric control is then changed. This gives a cyclic colouring and decoloration of the cell. At the same time, the change with time in the transmission through the cell is observed. It is found that assemblies having the vanadium pentoxide ion reservoir layer have a significantly improved cycle stability compared with previous assemblies (see Example 16) (see FIG. 2). Even after a relatively large number of on and off cycles, virtually no change in the properties of the electrochromic assembly is observed (see FIG. 6).

Example 22

Preparation of an Ion Storage Layer 3 ($CeO_2$)

A layer of $CeO_2$ on K glass is produced by vapour deposition in a high vacuum and this can be used as ion storage layer in an analogous way to Example 15.

What is claimed is:

1. An electrochromic assembly having a layer structure, characterized in that one layer is an electrically conductive, electrochromic polydioxythiophene and a further layer comprises ion storage compounds selected from the group consisting of the formulae (I) to (VI)

$$Me^1O_2 \qquad (I),$$

$$Me^2{}_2O_5 \qquad (II),$$

$$Li_xMe^1O_2 \qquad (III),$$

$$Li_xMe^2{}_2O_5 \qquad (IV),$$

$$Li_xMe^1O_{2+x/2} \qquad (V),$$

$$Li_xMe^2{}_2O_{5+x/2} \qquad (VI),$$

where $Me^1$ and $Me^2$ are each a metal of transition group III, IV and V of the Mendeleev Periodic Table, and x is from 0.001 to 5.

2. The electrochromic assembly according to claim 1, characterized in that $Me^1$ is zirconium, cerium or titanium and $Me^2$ is vanadium or niobium.

3. The electrochromic assembly according to claim 1, characterized in that the compounds present as ion storage are selected from the following groups:

$V_2O_5$,
$Li_xV_2O_5$,
$Li_xV_2O_{5+x/2}$,
$CeO_2$,
$Li_xCeO_2$,
$Li_xCeO_{2+x/2}$,
$Nb_2O_5$,
$Li_xNb_2O_5$.

4. The electrochromic assembly according to claim 1, characterized in that the ion storage present is one of the following mixtures:

$TiO_2$—$CeO_2$,
$CeO_2$—$V_2O_5$,
$TiO_2$—$V_2O_5$,
$Li_xCeO_2$—$Li_xV_2O_5$,
$Li_xTiO_2$—$Li_xCeO_2$,
$V_2O_5$—$Nb_2O_5$,
$Li_xV_2O_5$—$Li_xNb_2O_5$.

5. The electrochromic assembly according to claim 1, characterized in that the polydioxythiophenes are built up of structural units of the formula (VII)

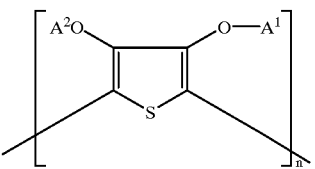

(VII)

where $A^1$ and $A^2$ are, independently of one another, substituted or substituted $C_1$–$C_4$-alkyl or together form substituted or unsubstituted $C_1$–$C_4$-alkylene, and n is an integer from 2 to 10,000, and polyanions are present as counterions.

6. Electrochromic assemblies according to claim 1, characterized in that polydioxythiophenes are built up of structural units of the formula (VIIa) or (VIb)

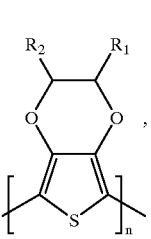

(VIIa)

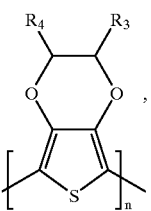

(VII b)

where $R_1$ and $R_2$ are, independently of one another, hydrogen, substituted or unsubstituted ($C_1$–$C_{18}$)-alkyl, ($C_2$–$C_{12}$)-alkenyl, ($C_3$–$C_7$)-cycloalkyl, ($C7$–$C_{15}$)-aralkyl, ($C_6$–$C_{10}$)-aryl, ($C_1$–$C_{18}$)-alkyloxy or ($C_2$–$C_{18}$)-alkyloxy ester and $R_3$ and $R_4$ are, independently of one another, hydrogen, but not both at the same time, or ($C_1$–$C_{18}$)-alkyl, ($C_2$–$C_{12}$)-alkenyl, ($C_3$–$C_7$)-cycloalkyl, ($C_7$–$C_{15}$)-aralkyl, ($C_6$–$C_{10}$)-aryl, ($C_1$–$C_{18}$)-alkyloxy or ($C_2$–$C_{18}$)-alkyloxy ester, each substituted by at least one sulphonate group, n is from 2 to 10,000.

7. The electrochromic assembly according to claim 1, characterized in that polydioxy-thiophenes are built up of structural units of the formula (VII a-1) or (VII b-1)

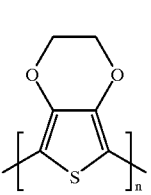

(VII a-1)

-continued

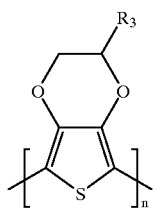

(VII b-1)

where $R_3$ is $(C_1-C_{18})$-alkyl, $(C_2-C_{12})$-alkenyl, $(C_3-C_7)$-cycloalkyl, $(C_7-C_{15})$-aralkyl, $(C_6-C_{10})$-aryl, $(C_1-C_{18})$-alkyloxy or $(C_2-C_{18})$-alkyloxy ester, each substitutued by at least one sulphonate group, and n is from 2 to 10,000.

8. The electrochromic assembly as claimed in claim 7, characterized in that the polyanions are anions of polymeric carboxylic acids and/or polymeric sulphonic acids.

9. The electrochromic assembly according to claim 1, characterized in that at least one transparent electrically conductive coating on a substrate is present.

10. The electrochromic assembly according to claim 1, characterized in that a plate mirrored with a metal is present as conductive layer for making electrical contact.

11. The electrochromic assembly according to claim 1, characterized in that a transparent gel electrolyte comprising the following components:
Polymer (crosslinked or uncrosslinked),
Li salt,
Solvent or solvent mixture is present.

12. The electrochromic assembly according to claim 1, characterized in that photo-crosslinkable polymers are present.

13. The electrochromic assembly according to claim 11 characterized in that organic and/or inorganic fillers and/or additives are present in the gel electrolyte.

\* \* \* \* \*